United States Patent
Bonte et al.

(10) Patent No.: US 6,441,125 B2
(45) Date of Patent: Aug. 27, 2002

(54) PREPARATION OF A COPOLYETHER ESTER

(75) Inventors: Geert I. V. Bonte, Diepenbeek (BE); Gerard H Werumeus Buning, Schinnen (NL); Krijn Dijkstra, Sittard (NL); Jean M. M. Warnier, Stein (NL)

(73) Assignee: DSM N. V., Heerlen (NL)

( * ) Notice: Subject to any disclaimer, the term of this patent is extended or adjusted under 35 U.S.C. 154(b) by 0 days.

(21) Appl. No.: 09/839,575

(22) Filed: Apr. 23, 2001

Related U.S. Application Data

(63) Continuation of application No. PCT/NL99/00647, filed on Oct. 18, 1999.

Foreign Application Priority Data

Oct. 23, 1998 (NL) .............................. 1010385

(51) Int. Cl.$^7$ .............................. C08G 63/78
(52) U.S. Cl. ................ 528/279; 528/275; 528/301; 528/302; 528/308; 528/308.6; 524/780; 524/783
(58) Field of Search ................ 528/275, 279, 528/301, 302, 308, 308.6; 524/780, 783

(56) References Cited

U.S. PATENT DOCUMENTS

| | | | | |
|---|---|---|---|---|
| 3,651,014 A | * | 3/1972 | Witsiepe | 528/274 |
| 3,763,109 A | * | 10/1973 | Witsiepe | 528/274 |
| 3,766,146 A | * | 10/1973 | Witsiepe | 528/274 |
| 3,801,547 A | * | 4/1974 | Hoeschele | 528/274 |
| 4,124,653 A | | 11/1978 | Whitlock | |
| 4,205,158 A | * | 5/1980 | Hoeschele | 528/272 |
| 4,452,965 A | | 6/1984 | Tung | |
| 4,687,835 A | * | 8/1987 | Zeilstra et al. | 528/300 |

FOREIGN PATENT DOCUMENTS

| | | |
|---|---|---|
| EP | 0 736 560 | 10/1996 |
| FR | 2 362 175 | 3/1978 |

* cited by examiner

*Primary Examiner*—Samuel A. Acquah
(74) *Attorney, Agent, or Firm*—Pillsbury Winthrop LLP

(57) ABSTRACT

The invention relates to a process for the preparation of a copolyether ester built up of hard polyester segments of repeating units derived from at least one alkylene glycol and at least one aromatic dicarboxylic acid or an ester thereof and soft segments derived from at least one polyalkylene oxide glycol, which comprises polymerization by condensation in the melt of at least one aromatic dicarboxylic acid, at least one alkylene glycol and at least one polyalkylene oxide glycol, in the presence of a catalyst based on a combination of titanium and a bivalent metal in a single compound or several compounds, characterized in that the molecular ratio of Ti:bivalent metal is at most 1.6, preferably at most 1.5.

The invention leads to a substantial shortening of the polycondensation time in the melt or a higher degree of polymerization of the copolyether ester. The solid-phase postcondensation can also be shortened substantially.

The process is effective in particular for copolyether esters with a high soft segment content and for copolyether esters with soft segments based on polypropylene oxide glycol.

14 Claims, No Drawings

PREPARATION OF A COPOLYETHER ESTER

This is a continuation of Inernational Application No. PCT/NL99/00647 filed Oct. 18, 1999 which designates the U.S., and that International Application was published under PCT Article 21(2) in English.

The invention relates to an improved process for the preparation of a copolyether ester. Copolyether esters are thermoplastic elastomer polymers built up of hard polyester segments of repeating units derived from at least one alkylene glycol and at least one aromatic dicarboxylic acid or an ester thereof and soft segments derived from a polyalkylene oxide glycol. Such a copolyether ester is generally prepared by a process involving the combining in the melt of at least one alkylene glycol, at least one aromatic dicarboxylic acid or an ester thereof and the polyalkylene oxide glycol. If an ester of an aromatic dicarboxylic acid is started from, for instance the dimethyl ester of terephthalic acid, then first a transesterification reaction takes place upon which the alkylene glycol and the polyalkylene oxide glycol take the methyl position in the aromatic dicarboxylic acid ester, with the methanol, which is volatile under the transesterification reaction conditions, being separated off. If the aromatic dicarboxylic acid is present in place of the ester, then esterification with the glycols takes place directly. Subsequently, polycondensation of the ester to yield polyester, in the case specified here copolyether ester, takes place under reaction conditions that are generally different from those of the transesterification or esterification. The polycondensation in the melt is then continued until a polycondensate with the desired molecular weight is obtained.

In a number of cases, especially if the polyalkylene oxide glycol is based on propylene oxide, the polycondensate must then be subjected to solid-phase post-condensation in order to achieve a sufficiently high molecular weight. For the softer copolyether esters the polycondensation is also much slower than for the harder copolyether ester that contain less soft segment.

It has proved possible to shorten the time needed to obtain a desired molecular weight in the melt condensation process by using a catalyst. Various catalysts have been developed for this; in practice, complex titanium compounds, in particular titanium tetrabutoxide (TBT), have found the widest application.

In U.S. Pat. No. 3,801,547 A and U.S. Pat. No. 4,687,835 A besides TBT salts of a bivalent metal, in particular magnesium acetate and calcium acetate are used as cocatalysts. In said patent publications other combinations of titanium and magnesium are also mentioned, for instance $Mg[HTi(OR_6)]_2$ where R=alkyl, and other complex titanates obtained from alkaline earth metal alkoxides and titanate esters. No reasons are given for the use of such combinations of a bivalent metal compound with the titanium compounds. The molar ratio of titanium to bivalent metal is generally 2:1.

In spite of the presence of said catalyst combinations, the state of the art processes take quite some time or lead, as for instance stated in Example 2 of U.S. Pat. No. 3,801,547-A at most to a copolyether ester having a minimum melt flow index (MFI) of 5.1 g/10 min. Polyether esters with such a high MFI can be used for only a limited number of processing techniques.

By using chain branching, for instance by alcohols or acids with a functionality of three or higher, for instance trimethylol propane or trimellitic acid, the time needed to reach a certain molecular weight can be shortened also, or a copolyether ester with a lower MFI can be obtained, see U.S. Pat. No. 4,205,158-A. However, the resulting branched copolyether esters have inferior elastic and fatigue properties, making them less suitable for use in, for instance, bellows in automotive applications under more extreme conditions.

Another process by which the problem of the low reaction rate in the preparation of the softer copolyether ester types can be obviated comprises partial replacement of the terephthalic acid by isophthalic acid, so that a lower polyalkylene oxide segments content is needed for a certain shore D hardness, while the hard segments content, which promotes a higher polycondensation rate, increases. However, this process has the drawback that the melting point of the copolyether ester is substantially lower than that of the corresponding copolyether ester that is based entirely on terephthalic acid, while moreover the glass transition temperature is higher. Particularly in applications at higher temperatures and extremely low temperatures, for instance under the bonnet, these iso- and terephthalic acid based copolyether esters prove less suitable. In addition, the elongation at break is lower.

The aim of the invention was therefore to find a process that offers the advantage of an increased polycondensation rate while it does not have the above-mentioned drawbacks, or only to a very limited extent.

The inventors have now found, very surprisingly, that when the ratio of titanium to bivalent metal in the catalyst combination is chosen to be substantially lower than the value of 2 that has so far been customary, for instance 1.6 or even lower, the polycondensation time for a given viscosity is substantially shortened and it proves possible to produce, without solid-phase post-condensation, copolyether ester that is suitable for, inter alia, injection moulding applications, but contains substantially less chain branching agent, or even no chain branching agent at all, than copolyether esters obtained in the melt according to the state of the art as described in U.S. Pat. No. 4,205,158-A.

The process according to the invention for the preparation of a copolyether ester with hard polyester segments of repeating units derived from at least one alkylene glycol and at least one aromatic dicarboxylic acid and soft segments derived from at least one polyalkylene oxide glycol, which comprises polymerization by polycondensation in the melt of at least one aromatic dicarboxylic acid, at least one alkylene glycol and at least one polyalkylene oxide glycol in the presence of a catalyst based on a combination of titanium and a bivalent metal in a single compound or a combination of titanium and bivalent metal containing compounds, is characterized in that the molecular ratio of titanium to bivalent metal is at most approximately 1.6, preferably at most 1.5.

The best results are achieved when the molecular ratio of titanium to bivalent metal is approximately 1.

Within the group of bivalent metals in particular the alkaline earth metals, for instance magnesium, barium and calcium, and zinc are very suitable. Magnesium is preferred. Preferably, the titanium and the bivalent metal are combined in two separate compounds. The compounds already referred to in the introduction are in principle eligible for use in the process according to the invention. However, the invention is not limited to these.

Preferably, the titanium is used in the form of a metal organic compound, for instance in the form of a titanium alkoxide, for instance TBT, or a titanium ester. The bivalent metal is preferably used in the form of a compound that is soluble in the reaction mixture, for instance in the form of an acetate, preferably magnesium acetate. The concentration of the catalyst in the reaction mixture may vary within broad limits; in general the useful activity is within a range of 0.01 wt. %–1 wt. % of TBT, relative to the terephthalic acid or terephthalate used. Preferably, the content lies between 0.03 and 0.3 wt. % TBT. Below a value of 0.01 wt. % TBT no effect is generally noticeable, and at a content of higher than 1 wt. % a polycondensate is obtained that is unsuitable for solid-phase post-condensation. Generally speaking, in the copolymerization of copolyether esters on the basis of polybutylene oxide diol or polyethylene oxide diol a smaller amount of catalyst will suffice than in the copolymerization of copolyether esters on the basis of polypropylene oxide diol. The same holds for the harder copolyether ester types, for which likewise a smaller amount of catalyst needs to be applied than for the softer types.

The titanium containing compound and the bivalent metal containing compound can simultaneously, or optionally separately, be added to the polycondensation. If an ester of the aromatic dicarboxylic acid is used, for instance the dimethyl ester of terephthalic acid, it is sometimes recommendable to add the bivalent metal containing compound only after the transesterification has taken place. The titanium containing compound can then be added in its entirety already at the start of the transesterification reaction in which methanol is released, or in two steps, viz. at the start of the transesterification and at the start of the polycondensation.

The process for the preparation of copolyether esters can otherwise be applied under the customary conditions for melt polycondensation, with the transesterification reaction taking place at elevated temperature, in general first between 150 and 260° C., with methanol being distilled off in case the dimethyl ester of terephthalic acid is used, and subsequently the polycondensation being continued at reduced pressure. The pressure is preferably chosen to be between 0.1 and 30 kPa, and the temperature between 230 and 275° C.

The polycondensation will be completed in the shortest time at the lowest pressure. It is also possible to use a dry inert gas atmosphere, for instance nitrogen circulation, instead of reduced pressure. Inclusion of oxygen should be avoided.

If desired, the reaction mixture may contain a minor amount of chain branching agent, However, the process according to the invention has the advantage that much lower concentrations than required in U.S. Pat. No. 4,205,258-A suffice. As chain branching agent use can be made of the compounds mentioned in this patent publication, viz. alcohols having a functionality of at least 3, for instance trimethylol propane, pentaerythritol and 1,1,4,4-tetrakis (hydroxymethyl)-cyclohexane, carboxylic acids having a functionality of at least 3, for instance trimellitic acid, trimesinic acid and 1,1,2,2-ethane tetracarboxylic acid and hydrocarboxylic acids having a functionality of at least 3, for instance citric acid, 3-hydroxyglutaric acid and dihydroxyglutaric acid. Preferably, the functionality is 3 or 4. Preferably, use is made of carboxylic acids having a functionality of 3 or 4, for instance trimellitic acid or an ester thereof and trimellitic anhydride. The chain branching agent content is preferably chosen below 0.3 eq/100 moles of dicarboxylic acid, more preferably below 0.2 eq/100 moles.

The process according to the invention is in principle suitable for the preparation of all types of copolyether esters with hard segments of repeating units, derived from at least one alkylene glycol and at least one aromatic dicarboxylic acid or an ester thereof, and soft segments derived from at least one polyalkylene oxide glycol.

The alkylene group generally contains 2–6 carbon atoms, preferably 2–4 C. Preferred alkylene glycols are ethylene glycol, propylene glycol and butylene glycol. As polyalkylene oxide glycol use can be made, for instance, of polybutylene oxide glycol, polypropylene oxide glycol and polyethylene oxide glycol or combinations thereof, for instance ethylene oxide end capped polypropylene oxide glycol. The invention is effective in particular when the polyalkylene oxide glycol is polypropylene oxide glycol or ethylene oxide end capped polypropylene oxide glycol.

Suitable for use as aromatic dicarboxylic acid are terephthalic acid, 1,4-naphthalene dicarboxylic acid, 4,4'-diphenyl dicarboxylic acid. In particular the combinations of butylene glycol or propylene glycol with terephthalic acid or naphthalene dicarboxylic acid and ethylene glycol with naphthalene dicarboxylic acid and diphenyl dicarboxylic acid (molar ratio 6:4-4:6) are very effective as hard segments for copolyether esters with a high melting point. Optionally, other dicarboxylic acids, such as isophthalic acid, may be present. In general, however, the effect of these is to depress the melting point.

The invention will now be elucidated with reference to the following examples and comparative experiments.
Materials used:

aromatic dicarboxylic acid DMT=dimethyl terephthalate alkylene glycol BDO=butylene glycol polyalkylene oxide glycol PL6200=Pluronic PE6200®= polypropylene oxide end capped with ethylene oxide glycol, from BASF Germany. ethylene oxide:propylene oxide=36:64 (weight ratio) THF 2000=tetrahydrofuran of molecular weight=2000 catalyst TBT—titanium tetrabutoxide MgAc=magnesium acetate tetrahydrate stabilizer Irganox® 1330 from Ciba-Geigy, Switzerland.

chain branching agent: TMP=trimethylol propane D-TMD=di-trimethylol propane TMA=trimellitic acid TME-TMA=trimethyl ester of trimellitic acid.

Examples I and II and Comparative Experiment A

In a glass reactor equipped with a stirrer 250 g of DMT, 280 g of BDO, 334 g of PL 6200, 250 mg of TBT, 3 g of Irganox® 1330 and varying amounts of MgAc and TMP (see Table 1) were combined and heated, with continuous stirring, to at most 220° C., with transesterification taking place between 160–220° C. and methanol being distilled off. The temperature was then raised to 241° C. and the pressure lowered to 0.13 kPa. When the stirrer torque has reached a value of 2.0 Nm at a fixed speed of 20 rpm, the reaction in the melt was terminated by slowly filling the reactor with nitrogen and removing the polycondensate obtained (a clear melt) from the reactor via a valve by means of overpressure. The clear polymer strand was cooled in a water bath and chopped into pieces. After drying, this polycondensate was subjected to post-condensation at a reduced pressure of about 0.2 kPa. The relative viscosity, $\eta_{rel}$, measured on a solution of 0.5 g in m-cresol, of the granules was measured at regular intervals. Table 1 gives the times needed to reach a relative viscosity of 3.2.

TABLE 1

|  | TBT [mg] | MgAc [mg] | TMP [wt. %]*) | Poly-cond. [min.] | Post-cond. [hours] |
| --- | --- | --- | --- | --- | --- |
| Comp. Exp. A | 250 | 79 | — | 225 | 21 |
| Example I | 250 | 158 | — | 210 | 16 |
| Example II | 250 | 158 | 0.6 | 190 | 11 |

*)relative to DMT

The above table clearly shows the positive effect which the reduction from 2:1 to 1:1 in the molar Ti:Mg ratio (Comp. Exp. A vs. Example I) has on the total polycondensation time, in particular the post-condensation time.

It is also interesting to note that, in spite of the low temperature, the polycondensation in the melt to a $\eta_{rel}$ of 2.7 can be achieved in just 3½ hours. A further reduction in the polymerization time proves possible through the use of a trihydric alcohol, TMP.

Example I was repeated, but now the polycondensation was continued until the stirrer torque increased no further. The polycondensate obtained had a $\eta_{rel}$=3.2; MFI-1.2 gr/10 min.

Examples III-X and Comparative Experiment B

The same starting materials were used as in Examples I and II and Comparative Experiment A. In a reactor vessel with stirrer having a capacity of about 100 litres, 20.7 kg of DMT, 14.7 kg of BDO, 27.6 kg of PL 6200, 250 g of Irganox® and varying amounts of TBT and MgAc were combined. In some experiments TMP or D-TMP was also added.

The transesterification reaction took place under somewhat lower than atmospheric pressure. The polycondensation was carried out at 242° C. in a vacuum, (P<0.1 kPa). In all experiments the polycondensation was stopped when the stirrer torque at a fixed speed, 30 revolutions per minute, reached a value of 9.0 Nm. The polycondensate was spun into a strand in a water bath and granulated. Table 2 presents an overview of the experiments carried out.

TABLE 2

|  | TBT [ppm]*) | MgOAc [ppm]*) | Ti/Mg | PC time [min.] | Notes |
| --- | --- | --- | --- | --- | --- |
| Comp. Exp B. | 1000 | 315 | 2:1 | 310 |  |
| Example III | 1000 | 630 | 1:1 | 234 |  |
| Example IV | 1000 | 788 | 1:1.25 | 199 |  |
| Example V | 1250 | 630 | 1.25:1 | 216 |  |
| Example VI | 1000 | 945 | 1:1.5 | 217 |  |
| Example VII | 1000 | 630 | 1:1 | 212 | 247° C. |
| Example IX | 1000 | 630 | 1:1 | 209 | 0.3 wt. % TMP |
| Example X | 1000 | 630 | 1:1 | 189 | 0.3 wt. % D-TMP |

*)relative to DMT

From the results presented in Table 2 it is clear what effect the higher magnesium concentration has on the polycondensation rate, Comp. Exp. B vs. Examples III–VII. There appears to be an optimum at a Ti/Mg ratio of about 1:1.25.

It also appears that the effect of an increase in the Ti concentration is smaller than a similar increase in the Mg concentration (Example V vs. IV). Examples IX and X show that the effect of a chain branching agent on the polycondensation time is only of the same order of magnitude as the effect of the change in the Ti/Mg ratio from 1 to 1.25.

The granules obtained could without problems be subjected to continued solid-phase condensation in the conventional manner in a tumble dryer at 190° C. and 0.3 kPa. With polycondensate granules obtained according to the process ($\eta_{rel}$=2.2–2.3), a 25% saving in time could be realized compared with granules from Comparative Example B to achieve a $\eta_{rel}$=2.8.

Example XI and Comparative Experiment D

In the glass reactor of Example I, 349 g of DMT, 240 g of BDO, 237 g of PL 6200, 0.45 g of TME-TMA and varying amounts of TBT and MgAc were combined, as shown in Table 3.

The polycondensation was carried out at 238 ° C. As in the other examples described, half of the TBT and the MgAc was not added before the polycondensation. The polycondensate obtained (torque 2.1 Nm at 20 rpm) was post-condensed in the solid phase at 190° C. and 0.2 kPa in an $N_2$ atmosphere. At regular intervals the relative viscosity was measured, $\eta_{rel}$ in m-cresol.

TABLE 3

|  | TBT [mg] | MgOAc [mg] | Ti/Mg [molar ratio] | PC [min.] | Notes |
| --- | --- | --- | --- | --- | --- |
| Example XI | 500 | 500 | 1:1.6 | 150 | 0.07 wt. % |
| Comp. Exp. D | 500 | 160 | 2:1 | 230 | TME-TEA present |

For the two polymerizates XI and D, solid-phase post-condensation yielded the following results.

XI hrs/$\eta_{rel}$=0/2.37, 4/3.04, 8/3.3, 16/4.3, 24/4.6, 40/5.3 and 48/5.6

The melt flow index MFI at 230° C after 24, 40 and 48 hours was 10, 1.9 and 1.6 g/10 min., respectively, which proves that products for all processing techniques can be obtained.

D: 0/2.40 4/2.98 8/3.2 16/4.1 24/4.2 40/4.4 48/4.4

Example XII and Comparative Experiments E and F

For use in film extrusion on a flat-film production line, three copolyether esters based on PBT and ethylene oxide end capped polypropylene oxide with a Shore D hardness of 38 produced on a commercial scale were compared.

Copolyether ester 1: A commercial product, produced using the process according to U.S. Pat. No. 4,205,158-A, Hytrel® 4056 from DuPont de Nemours, USA.

Copolyether ester 2: Arnitel 380® from DSM, produced by using a Ti:Mg=2:1 catalyst combination (TBT/MgAc).

Copolyether ester 3: copolyester according to the process of the invention with a Ti:Mg=1:1 (molar ratio) catalyst combination (TBT/MgAc). Composition as in Example IX, but with TME-TMA rather than TMP.

On a customary flat-film production line with a 2.5 m wide flat-film die film was produced at the maximum speed (approx. 100 m/min). The die pressure was about the same for the three copolyether esters.

It was investigated to what minimum film thickness stable production is possible at this maximum speed. In addition, the film quality was visually assessed.

With copolyether ester 1, stable production is possible to a minimum thickness of 30 $\mu$. At lower thicknesses the film width and the location at the wind-up roll varied.

In addition, gel formation was clearly observed.

Copolyether ester 2 yielded clear films without gel. The minimum film thickness to be realized was 25 $\mu$m.

Copolyether ester 3, according to the invention, yielded clear films while film thicknesses <10 μm could still be produced stably at maximum production speed.

Example XIII and Comparative Experiments G and H

Three copolyether esters based on polypropylene oxide with ethylene oxide end capped glycol and produced on a commercial scale, with a Shore D hardness of 38, were tested for their suitability for blow moulding of bellows.

Copolyether ester 4, Hytrel G® from DuPont de Nemours, obtained by the process of U.S. Pat. No. 4,205, 158-A, proved unsuitable, in spite of further solid-phase post-condensation, for processing by means of blow moulding, the melt viscosity and strength being too low.

Copolyether ester 5, Arnitel PM® 380, solid-phase post-condensed copolyether ester produced using a state-of-the-art Ti:Mg=2:1 (mole) catalyst combination (TBT/MgAc).

Copolyether ester 5 proved to have too low a melt viscosity/strength for processing by means of blow moulding.

Copolyether ester 6, according to the invention, was obtained by solid-phase post-condensation of copolyether ester 3 to an MFI of 1.5 g/10 min (at 240° C. and 2.16 kg). No problems were encountered in producing bellows having very good fatigue properties from copolyether ester 6.

Example XIV and Comparative Experiments I and J

In an industrial production installation 459 kg of DMT, 320 kg of BDO, 780 kg of p THF 2000, 13 kg of thermooxidative stabilizer based on Irg 1330 and catalyst, 615 g of TBT+393, 195 and 0 g of MgAc, respectively, were combined (XIV, I and J).

After the transesterification reaction in which methanol was distilled off, the temperature was raised to 246° C and polycondensation was continued with continuous stirring up to a final stirring capacity of the stirrer of 13 kW. The reactor contents were subsequently spun in a water bath and chopped into granules.

The relative viscosity for the three different copolyether esters proved to be 3.43±0.02.

The polycondensation time for the three copolyether ester preparations was: Example XIV 121 minutes, comparative experiment I 170 minutes and J 234 minutes.

The colour quality of the copolyether ester according to the invention is substantially better than that of the copolyether esters from comparative experiments I and J.

What is claimed is:

1. Process for the preparation of a copolyether ester built up of hard polyester segments of repeating units, derived from at least one alkylene glycol and at least one aromatic dicarboxylic acid or an ester thereof and soft segments derived from at least one polyalkylene oxide glycol, which comprises polymerization by condensation in the melt of at least one aromatic dicarboxylic acid, at least one alkylene glycol and at least one polyalkylene oxide glycol, in the presence of a catalyst based on a combination of titanium and a bivalent metal in a single compound or a combination of titanium and bivalent metal containing compounds, characterized in that the molecular ratio of Ti:bivalent metal is at most 1.6.

2. Process for the preparation of a copolyether ester according to claim 1, wherein the molecular ratio of Ti:bivalent metal is approximately 1.

3. Process according to claim 1, wherein the bivalent metal is magnesium.

4. Process according to claim 1, wherein the titanium and the bivalent metal are added in the form of two separate compounds.

5. Process according to claim 4, wherein titanium tetrabutoxide and magnesium acetate are added.

6. Process for the preparation of a copolyether ester according to claim 1, wherein the polyalkylene oxide glycol is selected from the group consisting of polytetramethyl oxide glycol, polytetrapropylene oxide glycol, polyethylene oxide glycol, and combinations thereof.

7. Process for the preparation of a copolyether ester according to claim 6, wherein the C:O ratio in the polyalkylene oxide glycol is between 1.9 and 1.2.

8. Process according to claim 1, wherein the soft segments content of the copolyether ester is at least 30 wt. %.

9. Copolyether ester obtained by the process according to claim 1.

10. Film comprising the copolyether ester according to claim 9.

11. Articles subject to repetitive deformation comprising the copolyether ester according to claim 9.

12. Product comprising copolyether ester according to claim 9 obtained by shaping in the melt.

13. Process for the preparation of a copolyether ester according to claim 7, wherein the C:O ratio in the polyalkylene oxide glycol is between 1.5 and 1.2.

14. Copolyether ester according to claim 9, containing a catalyst with molar ratio of titanium to bivalent metal of less than 1.6.

* * * * *